(12) United States Patent
Jones

(10) Patent No.: US 9,293,059 B1
(45) Date of Patent: Mar. 22, 2016

(54) PRE-NATAL SOUND SYSTEM

(76) Inventor: Everett Jones, Orlando, FL (US)

(*) Notice: Subject to any disclaimer, the term of this patent is extended or adjusted under 35 U.S.C. 154(b) by 1667 days.

(21) Appl. No.: 12/455,378

(22) Filed: Jun. 1, 2009

(51) Int. Cl.
*G09B 19/00* (2006.01)

(52) U.S. Cl.
CPC ........................................ *G09B 19/00* (2013.01)

(58) Field of Classification Search
USPC ................................... 434/236; 224/660, 664
See application file for complete search history.

(56) References Cited

U.S. PATENT DOCUMENTS

| | | | | |
|---|---|---|---|---|
| 4,747,399 A | * | 5/1988 | Glomstead | 602/36 |
| 4,798,539 A | * | 1/1989 | Henry et al. | 434/319 |
| 4,830,007 A | * | 5/1989 | Stein | 381/151 |
| 4,934,998 A | * | 6/1990 | Thomas, Jr. | 600/27 |
| 5,109,421 A | * | 4/1992 | Fox | 381/333 |
| 5,873,736 A | * | 2/1999 | Harrison | 434/322 |
| D407,623 S | | 4/1999 | Romo et al. | |
| 5,913,834 A | * | 6/1999 | Francais | 600/591 |
| 6,169,814 B1 | * | 1/2001 | Johnson | 381/333 |
| 6,840,775 B2 | | 1/2005 | Sailors | |

* cited by examiner

*Primary Examiner* — Melba Bumgarner
*Assistant Examiner* — Joseph B Baldori

(57) ABSTRACT

A primary strap has upper and lower edges, interior and exterior faces, first and second ends, and a mid-point. Hook and loop patches are secured to the interior face of the primary strap adjacent to the first and second ends. A plurality of secondary straps of varying lengths each have an interior and exterior face and opposed ends with hook and loop members on each interior face. The hook and loop members are adjacent to each end of each secondary strap. An elongated closure strap with interior and exterior faces and opposed ends is coupled along its length to the primary strap to form an upper portion and a lower portion. Hook and loop fasteners on essentially the entire length of the upper and lower portions of the exterior face of the closure strap, the hook and loop fasteners adapted to be separably coupled to form a passageway.

1 Claim, 2 Drawing Sheets

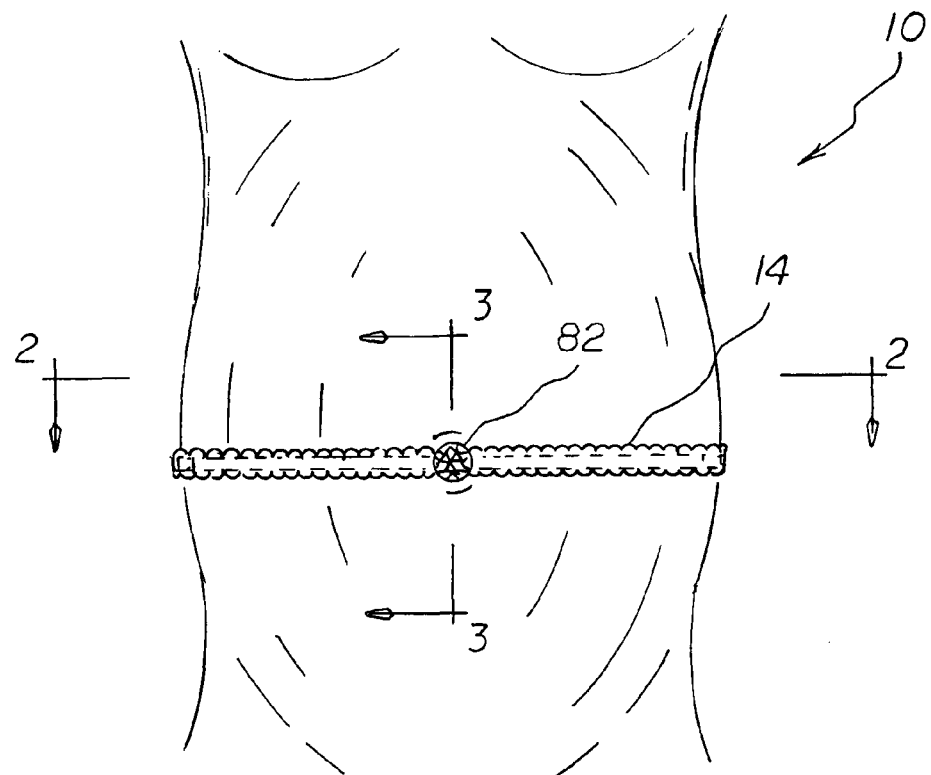
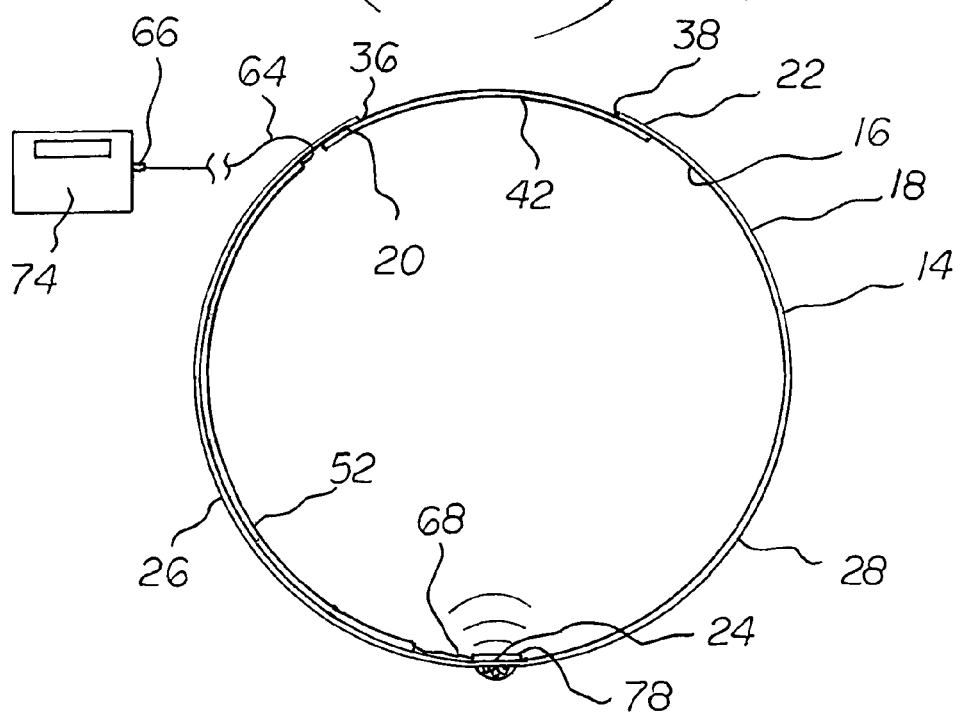

PRE-NATAL SOUND SYSTEM

BACKGROUND OF THE INVENTION

1. Field of the Invention

The present invention relates to a pre-natal sound system and more particularly pertains to providing music and other entertaining and educational sounds to a yet unborn infant in a safe, convenient, and economical manner.

2. Description of the Prior Art

The use of pre-natal sound systems of known designs and configurations is known in the prior art. More specifically, pre-natal sound systems of known designs and configurations previously devised and utilized for the purpose of providing sounds to a yet unborn infant are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 6,840,775 issued Jan. 11, 2005 to Sailors relates to a Fetal Educator Strap and U.S. Pat. No. Des. 447,623 issued Apr. 6, 1999 to Romo relates to Pre-Natal Audio Belt.

While these devices fulfill their respective, particular objectives and requirements, the aforementioned patents do not describe a pre-natal sound system that allows for providing music and other entertaining and educational sounds to a yet unborn infant in a safe, convenient, and economical manner.

In this respect, the pre-natal sound system according to the present invention substantially departs from the conventional concepts and designs of the prior art, and in doing so provides an apparatus primarily developed for the purpose of providing music and other entertaining and educational sounds to a yet unborn infant in a safe, convenient, and economical manner.

Therefore, it can be appreciated that there exists a continuing need for a new and improved pre-natal sound system which can be used for providing music and other entertaining and educational sounds to a yet unborn infant in a safe, convenient, and economical manner. In this regard, the present invention substantially fulfills this need.

SUMMARY OF THE INVENTION

In view of the foregoing disadvantages inherent in the known types of pre-natal sound systems of known designs and configurations now present in the prior art, the present invention provides an improved pre-natal sound system. As such, the general purpose of the present invention, which will be described subsequently in greater detail, is to provide a new and improved pre-natal sound system and method which has all the advantages of the prior art and none of the disadvantages.

To attain this, the present invention essentially comprises a pre-natal sound system 10 for providing music and other entertaining and educational sounds to a yet unborn infant in a safe, convenient and economical manner. First provided is an essentially inextensible primary strap having an interior face and an exterior face. The primary strap has a first end and a second end spaced by a length of between 20 inches and 32 inches with a mid-point between the first and second ends. The primary strap includes a first section between the first end and the mid-point. The primary strap includes a second section between the second end and the mid-point. The primary strap has an upper edge and a lower edge with a central axis equally spaced between the upper and lower edges. A first hook and loop patch is secured to the interior face of the primary strap adjacent to the first end. A second hook and loop patch is secured to the interior face of the primary strap adjacent to the second end.

Next provided is a plurality of elastic secondary straps. The secondary straps include a short strap having a length of about 10 inches when unstretched. The secondary straps also include a medium strap having a length of about 14 inches when unstretched. The secondary straps also include a long strap having a length of about 18 inches when unstretched. Each secondary strap has an interior face and an exterior face with opposed ends. Hook and loop circles are provided on the interior face of each secondary strap. The hook and loop circles are located adjacent to each end of each secondary strap.

Next provided is a closure strap having an interior face and an exterior face with opposed ends. The opposed ends are spaced by a length between 85 percent and 95 percent of the length of the first section of the primary strap. Stitching couples the closure strap to the first section of the primary strap to form an upper portion and a lower portion. Upper hook and loop fasteners are provided on essentially the entire length of the upper portion of the exterior face of the closure strap. Lower hook and loop fasteners are provided on essentially the entire length of the lower portion of the exterior face of the closure strap. The upper and lower hook and loop fasteners are adapted to be separably coupled to form a passageway.

An electrical line is next provided. The electrical line has an input end and an output end with a central extent between the input and output ends. The central extent is positioned within the passageway. The output end is positioned adjacent to the mid-point of the primary strap. The input end is positioned remote from the primary strap.

Next, a sound generation device is provided. The sound generating device is remote from the primary strap. The sound generating device is operatively coupled to the input end of the electrical line. The sound generating device is chosen from the class of sound generating devices including i-pods, computers, radios, tape players and disc players.

A speaker is next provided. The speaker is secured to the interior face of the primary strap adjacent to the mid-point. The speaker is electrically coupled to the output end of the electrical line.

Lastly, a decorative element is provided. The decorative element is secured to the exterior face of the primary strap adjacent to the mid-point. The decorative element overlies the speaker. In this manner, the speaker may readily be positioned over a naval of a pregnant user to provide music and other entertaining and educational sounds to a yet unborn infant. Such sounds are provided in a safe, convenient and economical manner.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved pre-natal sound system which has all of the advantages of the prior art pre-natal sound systems of known designs and configurations and none of the disadvantages.

It is another object of the present invention to provide a new and improved pre-natal sound system which may be easily and efficiently manufactured and marketed.

It is further object of the present invention to provide a new and improved pre-natal sound system which is of durable and reliable constructions.

An even further object of the present invention is to provide a new and improved pre-natal sound system which is susceptible of a low cost of manufacture with regard to both materials and labor, and which accordingly is then susceptible of low prices of sale to the consuming public, thereby making such pre-natal sound system economically available to the buying public.

Even still another object of the present invention is to provide a pre-natal sound system for providing music and other entertaining and educational sounds to a yet unborn infant in a safe, convenient, and economical manner.

Lastly, it is an object of the present invention to provide a new and improved pre-natal sound system having a primary strap with upper and lower edges, interior and exterior faces, first and second ends, and a mid-point. Hook and loop patches are secured to the interior face of the primary strap adjacent to the first and second ends. A plurality of secondary straps of varying lengths each have an interior and exterior face and opposed ends with hook and loop members on each interior face. The hook and loop members are adjacent to each end of each secondary strap. An elongated closure strap with interior and exterior faces and opposed ends is coupled along its length to the primary strap to form an upper portion and a lower portion. Hook and loop fasteners on essentially the entire length of the upper and lower portions of the exterior face of the closure strap, the hook and loop fasteners adapted to be separably coupled to form a passageway.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a front elevational view of a pre-natal sound system constructed in accordance with the principles of the present invention.

FIG. 2 is a plan view of the system taken along line 2-2 of FIG. 1.

The same reference numerals refer to the same parts throughout the various Figures.

DESCRIPTION OF THE PREFERRED EMBODIMENT

Figure 3:
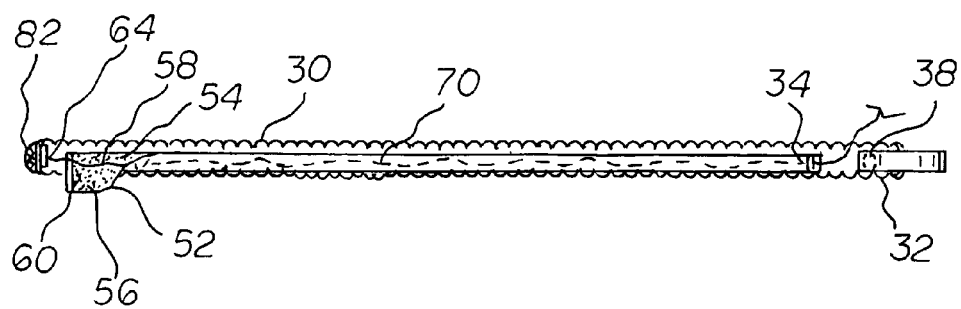
FIG. 3 is a cross sectional view of the system taken along line 3-3 of FIG. 1.
Figure 4:
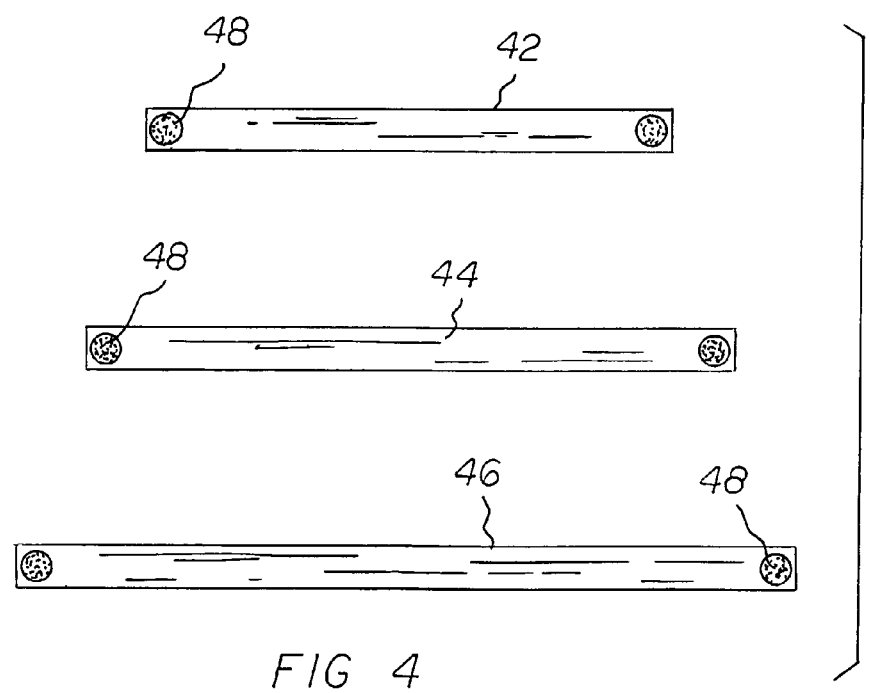
FIG. 4 is a set of extender strips adapted for use in the system of FIGS. 1 through 3.

With reference now to the drawings, and in particular to FIG. 1 thereof, the preferred embodiment of the new and improved pre-natal sound system embodying the principles and concepts of the present invention and generally designated by the reference numeral 10 will be described.

The present invention, the pre-natal sound system 10 is comprised of a plurality of components. Such components in their broadest context include a primary strap, a plurality of secondary straps, and an elongated closure strap. Such components are individually configured and correlated with respect to each other so as to attain the desired objective.

A pre-natal sound system 10 for providing music and other entertaining and educational sounds to a yet unborn infant, in a safe, convenient and economical manner) the system comprising, in combination:

First provided is an essentially inextensible primary strap 14 having an interior face 16 and an exterior face 18. The primary strap has a first end 20 and a second end 22 spaced by a length of between 20 inches and 32 inches with a mid-point 24 between the first and second ends. The primary strap includes a first section 26 between the first end and the mid-point. The primary strap includes a second section 28 between the second end and the mid-point. The primary strap has an upper edge 30 and a lower edge 32 with a central axis 34 equally spaced between the upper and lower edges. A first hook and loop patch 36 is secured to the interior face of the primary strap adjacent to the first end. A second hook and loop patch 38 is secured to the interior face of the primary strap adjacent to the second end.

Next provided is a plurality of elastic secondary straps 42, 44, 46. The secondary straps include a short strap 42 having a length of about 10 inches when unstretched. The secondary straps also include a medium strap 44 having a length of about 14 inches when unstretched. The secondary straps also include a long strap 46 having a length of about 18 inches when unstretched. Each secondary strap has an interior face and an exterior face with opposed ends. Hook and loop circles 48 are provided on the interior face of each secondary strap. The hook and loop circles are located adjacent to each end of each secondary strap.

In the preferred embodiment, the hook and loop patches at the ends of the primary strap are in a rectangular configuration. Note FIG. 3. The hook and loop members at the ends of the secondary straps are in a circular configuration. Note FIG. 3. FIG. 2 illustrates the primary and secondary straps coupled for operation and use. The preferred hook and loop fastener is a Velcro brand closure/fastener. Velcro is a trademark of Velcro S.A Corporation of Curacao, Netherlands.

Next provided is a closure strap 52 having an interior face and an exterior face with opposed ends. The opposed ends are spaced by a length between 85 percent and 95 percent of the length of the first section of the primary strap. Stitching couples the closure strap to the first section of the primary strap to form an upper portion 54 and a lower portion 56. Upper hook and loop fasteners 58 are provided on essentially the entire length of the upper portion of the exterior face of the closure strap. Lower hook and loop fasteners 60 are provided on essentially the entire length of the lower portion of the exterior face of the closure strap. The upper and lower hook and loop fasteners are adapted to be separably coupled to form a passageway.

An electrical line 64 is next provided. The electrical line has an input end 66 and an output end 68 with a central extent 70 between the input and output ends. The central extent is positioned within the passageway. The output end is positioned adjacent to the mid-point of the primary strap. The input end is positioned remote from the primary strap.

Next, a sound generation device 74 is provided. The sound generating device is remote from the primary strap. The sound generating device is operatively coupled to the input end of the electrical line. The sound generating device is chosen from the class of sound generating devices including i-pods, computers, radios, tape players and disc players.

A speaker 78 is next provided. The speaker is secured to the interior face of the primary strap adjacent to the mid-point. The speaker is electrically coupled to the output end of the electrical line.

Lastly, a decorative element 82 is provided. The decorative element is secured to the exterior face of the primary strap adjacent to the mid-point. The decorative element overlies the speaker. In this manner, the speaker may readily be positioned over a naval of a pregnant user to provide music and other entertaining and educational sounds to a yet unborn infant. Such sounds are provided in a safe, convenient and economical manner.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A pre-natal sound system for providing music and other entertaining and educational sounds to a yet unborn infant, the system comprising, in combination:

an essentially inextensible primary strap having an interior face and an exterior face, the primary strap having a first end and a second end spaced by a length of between 20 inches and 32 inches with a mid-point between the first and second ends, the primary strap including a first section between the first end and the mid-point, the primary strap including a second section between the second end and the mid-point, the primary strap having an upper edge and a lower edge with a central axis equally spaced between the upper and lower edges, a first hook and loop patch secured to the interior face of the primary strap adjacent to the first end, a second hook and loop patch secured to the interior face of the primary strap adjacent to the second end;

a plurality of separate elastic secondary straps, the secondary straps including a short strap having a length of about 10 inches when unstretched, the secondary straps including a medium strap having a length of about 14 inches when unstretched, the secondary straps including a long strap having a length of about 18 inches when unstretched, each secondary strap having an interior face and an exterior face with opposed ends and hook and loop circles on the interior face of each secondary strap, the hook and loop circles being located adjacent to each end of each secondary strap;

a closure strap having an interior face and an exterior face with opposed ends, the opposed ends being spaced by a length between 85 percent and 95 percent of the length of the first section of the primary strap, stitching coupling the closure strap to the first section of the primary strap to form an upper portion and a lower portion, upper hook and loop fasteners on essentially the entire length of the upper portion of the exterior face of the closure strap, lower hook and loop fasteners on essentially the entire length of the lower portion of the exterior face of the closure strap, the upper and lower hook and loop fasteners adapted to be separably coupled to form a passageway;

an electrical line having an input end and an output end with a central extent between the input and output ends, the central extent being positioned within the passageway, the output end positioned adjacent to the mid-point of the primary strap, the input end being positioned remote from the primary strap;

a sound generation device remote from the primary strap, the sound generating device being operatively coupled to the input end of the electrical line, the sound generating device being chosen from the class of sound generating devices including, for example, I-pods, computers, radios, tape players and disc players;

a speaker secured interiorly of the interior face of the primary strap and directly to the interior face of the primary strap adjacent to the mid-point, the speaker positioned over a naval of a pregnant user, the speaker being electrically coupled to the output end of the electrical line; and a decorative element having a circular configuration with a center secured exteriorly of and directly to the exterior face of the primary strap adjacent to the mid-point, the center of the decorative element overlying the speaker whereby the speaker may readily be positioned to provide music and other entertaining and educational sounds to a yet unborn infant, such sounds being provided in a safe, convenient and economical manner.

* * * * *